(12) United States Patent
Ishida

(10) Patent No.: US 6,580,238 B2
(45) Date of Patent: Jun. 17, 2003

(54) MOTOR DRIVER

(75) Inventor: Takuya Ishida, Kyoto (JP)

(73) Assignee: Rohm Co. Ltd., Kyoto (JP)

( * ) Notice: Subject to any disclaimer, the term of this patent is extended or adjusted under 35 U.S.C. 154(b) by 45 days.

(21) Appl. No.: 09/904,550

(22) Filed: Jul. 16, 2001

(65) Prior Publication Data

US 2002/0017884 A1 Feb. 14, 2002

(30) Foreign Application Priority Data

| Jul. 17, 2000 | (JP) | ........................................ 2000-215723 |
| Jul. 17, 2000 | (JP) | ........................................ 2000-215724 |
| Jul. 17, 2000 | (JP) | ........................................ 2000-215725 |

(51) Int. Cl.$^7$ ................................................ H02P 7/00
(52) U.S. Cl. ........................ 318/432; 318/254; 318/138; 318/439
(58) Field of Search ................................ 318/254, 138, 318/432, 439

(56) References Cited

U.S. PATENT DOCUMENTS

| 4,839,754 A | * | 6/1989 | Gami et al. ............... 360/73.01 |
| 5,412,809 A | * | 5/1995 | Tam et al. ................... 713/324 |
| 5,689,483 A | * | 11/1997 | Ikeda ........................... 369/228 |
| 5,788,010 A | * | 8/1998 | Mukai et al. ............... 180/446 |
| 5,969,489 A | * | 10/1999 | Itou et al. ................... 318/254 |

* cited by examiner

*Primary Examiner*—Rita Leykin
(74) *Attorney, Agent, or Firm*—Arent Fox Kintner Plotkin & Kahn

(57) ABSTRACT

In a motor driver furnished with a function of controlling the driving of a motor through negative feedback control of the current supplied to the coil of the motor, the motor driver permits the setting of a target value of the current that is negatively fed back, and sets the target value in such a way that the target value at a time point when the current starts being supplied to the coil of the motor is smaller than the target value after the current starts being supplied to the coil of the motor. This permits the current flowing through the coil to increase more gradually than in conventional circuit configurations in which the target value is fixed at the maximum value thereof before the current starts being supplied to the coil of the motor. Thus, it is possible to suppress overshooting and oscillation in the current flowing through the coil and oscillation in the voltage across the coil, and thereby reduce noise.

9 Claims, 15 Drawing Sheets

MOTOR DRIVER

BACKGROUND OF THE INVENTION

1. Field of the Invention

The present invention relates to a motor driver furnished with a function of controlling the driving of a motor, such as a stepping motor or spindle motor, through negative feedback control of the current supplied to the motor.

2. Description of the Prior Art

FIG. 13 shows the circuit configuration of a conventional, typical stepping motor driver. Reference numerals 401A and 401B represent output circuits. Reference numeral 402A represents an operational amplifier. Reference numeral 402B represents a direct-current voltage source. Reference numeral 402C represents a controller. Reference numeral 402D represents an externally fitted resistor. Reference numerals 403A and 403B represent coils of a stepping motor. Reference numerals 404A, 404B, 404C, 404D, 404E, 404F, 404G, and 404H represent NPN-type transistors. Here, it is assumed that the stepping motor driver shown in FIG. 13 is for driving a stepping motor having two coils.

The output circuit 401A is composed of four transistors 404A, 404B, 404C, and 404D. The output circuit 401B is composed of four transistors 404E, 404F, 404G, and 404H. The collectors of the transistors 404A, 404C, 404E, and 404G are connected together to a terminal 405A. The terminal 405A is connected to a supply voltage $V_{CC}$. The emitters of the transistors 404B, 404D, 404F, and 404H are connected together to a terminal 405B. The terminal 405B is connected through the resistor 402D to ground GND.

In the output circuit 401A, the emitter of the transistor 404A and the collector of the transistor 404B are connected together to a terminal 405C, and the emitter of the transistor 404C and the collector of the transistor 404D are connected together to a terminal 405D. Between the terminals 405C and 405D, one coil 403A of the stepping motor is connected.

In the output circuit 401B, the emitter of the transistor 404E and the collector of the transistor 404F are connected together to a terminal 405E, and the emitter of the transistor 404G and the collector of the transistor 404H are connected together to a terminal 405F. Between the terminals 405E and 405F, the other coil 403B of the stepping motor is connected.

A direct-current voltage generated by the voltage source 402B is fed to the non-inverting input terminal (+) of the operational amplifier 402A, of which the inverting input terminal (−) is connected to the terminal 405B so that all the current that flows through the stepping motor is converted into a voltage by the resistor 402D and is then fed to the inverting input terminal (−).

The controller 402C controls the turning on/off of the individual transistors constituting the output circuits 401A and 401B in such a way that the direction of the current that flows through the coils 403A and 403B is switched with appropriate timing. Moreover, the controller 402C controls the current fed to the bases of the individual transistors constituting the output circuits 401A and 401B when those transistors are turned on in such a way that the output of the operational amplifier 402A does not fall below a reference level. In this way, negative feedback control is achieved in such a way that the current flowing through the stepping motor as a whole does not exceed a predetermined value.

However, in cases like this, where the current flowing through a stepping motor is controlled through negative feedback, depending on the specifications of the stepping motor actually driven, the following problems may arise. As shown in FIG. 14, when the transistors constituting the output circuits are turned on/off, the inductance present in the coils of the stepping motor may cause overshooting or oscillation in the current I flowing through the coils of the stepping motor, or oscillation lasting for several microseconds to several milliseconds in the voltages $V_A$ and $V_B$ across the coils, both leading to increased noise. This often causes problems in particular in electronic devices such as floppy disk drives that comply with the USB standard, because such devices receive electric power from their host and thus need to meet strict requirements with respect to the current that they consume.

Moreover, there is a type of problem in which, although an abnormal current is flowing through the coil of one phase of the stepping motor, the current flowing through the motor as a whole appears quite normal. In such a case, with the conventional stepping motor driver described above, which controls the current flowing through the motor as a whole with a single negative feedback circuit, it is not possible to overcome the problem, and thus it is not possible to drive the stepping motor with satisfactory accuracy.

Moreover, since a current so high as all the current supplied to the stepping motor is controlled through negative feedback, the resistances of the conductors that connect the output circuits to the supply power terminals affect the feedback factor greatly. Thus, problems tend to result from the fact that the resistances of conductors vary from one IC chip to another.

FIG. 15 shows a plan view and a connection diagram of the conventional stepping motor driver described above. As this figure shows, the output circuits 401A and 401B are connected by way of a typical conductor 407 to the terminal 405B, which in turn is connected, outside the stepping motor driver, through the resistor 402D to ground $V_{GND}$. However, the two output circuits 401A and 401B use different lengths of this conductor 407, and thus the resistance of the conductor 407 from the output circuits 401A and 401B to the terminal 405B differs between them, with the result that the currents flowing through the coils 403A and 403B differ significantly from each other. Furthermore, the switching noise that is generated in the output circuits 401A and 401B tends to affect a current limiter circuit 406A and other internal circuits adversely. This often causes problems in particular in electronic devices that comply with the USB standard, because such devices need to meet strict requirements with respect to the current that they consume.

SUMMARY OF THE INVENTION

An object of the present invention is to provide a motor driver that is furnished with a function of controlling the current supplied to the coils of a motor through negative feedback and that is designed to minimize the noise accompanying the switching operations performed in output circuits.

Another object of the present invention is to provide a motor driver that can drive a motor such as a stepping motor with satisfactory accuracy.

Another object of the present invention is to provide a motor driver that is less prone to problems resulting from the fact that the resistances of conductors vary from one IC chip to another.

Another object of the present invention is to provide a motor driver that can supply individual coils of a motor with as equal currents as possible.

Another object of the present invention is to provide a motor driver that can minimize the adverse effect of the switching noise generated in output circuits on other internal circuits.

To achieve the above objects, according to one aspect of the present invention, in a motor driver furnished with a function of controlling the driving of a motor through negative feedback control of the current supplied to the coil of the motor, the motor driver permits the setting of a target value of the current that is negatively fed back, and sets the target value in such a way that the target value at a time point when the current starts being supplied to the coil of the motor is smaller than the target value after the current starts being supplied to the coil of the motor.

In this circuit configuration, the current that flows through the coil increases more gradually than in conventional circuit configurations in which the target value is fixed at the maximum value thereof before the current starts being supplied to the coil of the motor. This suppresses overshooting and oscillation in the current flowing through the coil and oscillation in the voltage across the coil, and thereby reduces noise.

According to another aspect of the present invention, in a motor driver furnished with a function of controlling the driving of a motor through negative feedback control of the currents supplied to the motor, the currents flowing through the coils of different phases of the motor are negatively fed back individually.

This circuit configuration is free from the type of problem in which, although the current flowing through the motor as a whole appears normal, actually an abnormal current is flowing through the coil of one phase of the motor as experienced in cases where negative feedback control is achieved on the basis of the current flowing through the motor as a whole. As a result, it is possible to drive the motor with satisfactory accuracy. Moreover, it is also possible to minimize the effect of the resistances of conductors on the feedback factor, and thereby reduce problems resulting from the fact that the resistances of conductors vary from one IC chip to another.

According to another aspect of the present invention, in a motor driver furnished with a function of controlling the driving of a motor through negative feedback control of the currents supplied to the motor, damping devices are built in between the terminals to which the coils of the motor are connected.

In this circuit configuration, the currents that flow through the coils of the motor vary more gradually than in a circuit configuration without damping devices. This suppresses overshooting and oscillation in the currents flowing through the coils and oscillation in the voltages across the coils, and thereby reduces noise.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
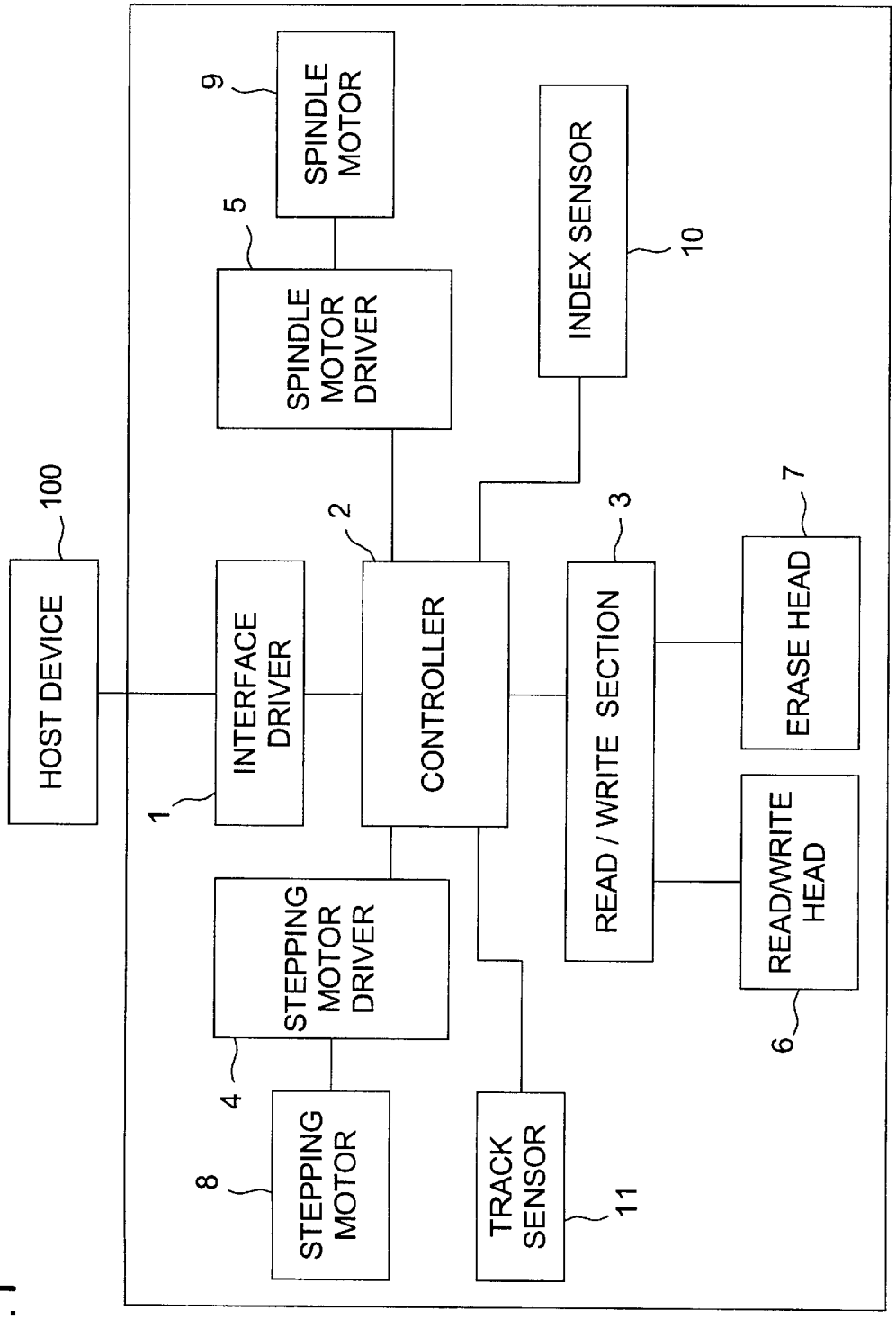
FIG. 1 is a block diagram of a floppy disk drive incorporating a stepping motor driver embodying the invention.

Hereinafter, embodiments of the present invention will be described with reference to the drawings. FIG. 1 shows a block diagram of a floppy disk drive (hereinafter referred to as the "FDD") for writing and reading data to and from a floppy disk, which is a type of magnetic disk. In this figure, reference numeral 1 represents an interface driver, reference numeral 2 represents a controller, reference numeral 3 represents a read/write section, reference numeral 4 represents a stepping motor driver, reference numeral 5 represents a spindle motor driver, reference numeral 6 represents a read/write head, reference numeral 7 represents an erase head, reference numeral 8 represents a stepping motor, reference numeral 9 represents a spindle motor, reference numeral 10 represents an index sensor, reference numeral 11 represents a track sensor, and reference numeral 100 represents a host device (for example, a personal computer) that is provided externally.

Now, how each of these blocks operates will be described. The interface driver 1 permits the controller 2 and the read/write section 3 to exchange data with the host device 100.

The controller 2 controls the data recording and reproducing operations of the FDD as a whole on the floppy disk in accordance with the data received through the interface driver 1 from the host device 100. Moreover, the controller 2 transmits data indicating the operation status of the FDD and the like through the interface driver 1 to the host device 100.

Under the control of the controller 2, in a data recording operation, the read/write section 3 feeds a current to the read/write head 6, which is a magnetic head, in accordance with the data received through the interface driver 1 from the host device 100, and also feeds a current to the erase head 7, which also is a magnetic head. As a result, relevant portions of the magnetic surface of the floppy disk are initialized by the erase head 7 and are then magnetized by the read/write head 6 in accordance with the data. In this way, the data is recorded on the floppy disk. On the other hand, in a data reproducing operation, the read/write section 3 reproduces data from the floppy disk in accordance with the voltage that appears across the read/write head 6, and then transmits the reproduced data through the interface driver 1 to the host device 100.

Under the control of the controller 2, the stepping motor driver 4 drives the stepping motor 8, which moves the read/write head 6 and the erase head 7 in the direction of a radius of the floppy disk. Under the control of the controller 2, the spindle motor driver 5 drives the spindle motor 9, which rotates the floppy disk.

The index sensor 10 enables the controller 2 to detect whether the floppy disk is rotating normally or not. The track sensor 11 enables the controller 2 to detect whether the read/write head 6 and the erase head 7 are positioned at the outermost edge of the floppy disk or not.

Figure 2:
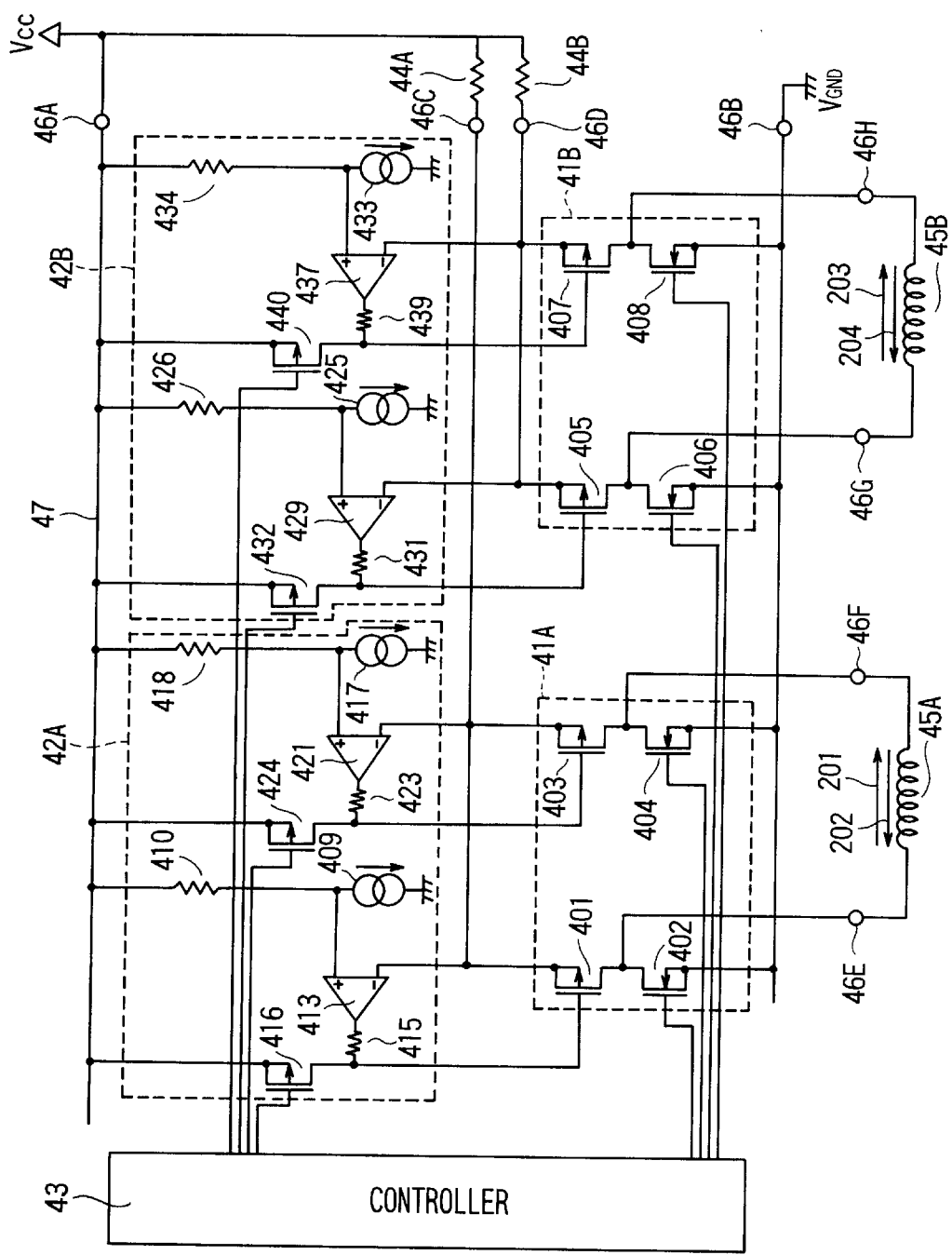
FIG. 2 is a circuit diagram showing the circuit configuration of a stepping motor driver embodying the invention.

FIG. 2 shows a circuit diagram of the stepping motor driver 4. In this figure, reference numerals 41A and 41B represent output circuits, reference numerals 42A and 42B represent current limiter circuits, reference numeral 43 represents a controller, reference numerals 44A and 44B represent externally fitted resistors, each having a resistance of 1Ω or lower, for converting a current into a voltage, and reference numerals 45A and 45B represent the coils of the stepping motor.

The output circuit 41A is composed of a p-channel MOS FET (hereinafter referred to as a "pMOS") 401, an n-channel MOS FET (hereinafter referred to as an "nMOS") 402, a pMOS 403, and an nMOS 404. The output circuit 41B is composed of a pMOS 405, an nMOS 406, a pMOS 407, and an NMOS 408. The sources of the pMOSs 401 and 403 are connected together to a terminal 46C. The terminal 46C is connected through the resistor 44A to the supply voltage $V_{CC}$.

The sources of the pMOSs 405 and 407 are connected together to a terminal 46D. The terminal 46D is connected through the resistor 44B to the supply voltage $V_{CC}$. The sources of the nMOSs 402, 404, 406, and 408 are connected together to a terminal 46B. The terminal 46B is connected to ground $V_{GND}$.

The drains of the pMOS 401 and the nMOS 402 are connected together to a terminal 46E. The terminal 46E is connected to one end of the coil 45A. The drains of the pMOS 403 and the nMOS 404 are connected together to a terminal 46F. The terminal 46F is connected to the other end of the coil 45A.

The drains of the pMOS 405 and the nMOS 406 are connected together to a terminal 46G. The terminal 46G is connected to one end of the coil 45B. The drains of the pMOS 407 and the nMOS 408 are connected together to a terminal 46H. The terminal 46H is connected to the other end of the coil 45B.

The current limiter circuit 42A is composed of a constant-current source 409, a resistor 410, an operational amplifier 413, a resistor 415, a pMOS 416, a constant-current source 417, a resistor 418, an operational amplifier 421, a resistor 423, and a pMOS 424.

The current limiter circuit 42B is composed of a constant-current source 425, a resistor 426, an operational amplifier 429, a resistor 431, a pMOS 432, a constant-current source 433, a resistor 434, an operational amplifier 437, a resistor 439, and a pMOS 440.

The current inflow side of the constant-current source 409 is connected through the resistor 410 to a supply power line 47. The current outflow side of the constant-current source 409 is grounded. To the supply power line 47, the supply voltage $V_{CC}$ is applied via the terminal 46A from outside. The operational amplifier 413 has its non-inverting input terminal (+) connected to the node between the constant-current source 409 and the resistor 410, and has its inverting input terminal (−) connected to the terminal 46C. The output terminal of the operational amplifier 413 is connected through the resistor 415 to the gate of the pMOS 401 belonging to the output circuit 41A. The pMOS 416 has its source connected to the supply power line 47, has its drain connected to the gate of the pMOS 401, and receives at its gate the voltage output from the controller 43.

The current inflow side of the constant-current source 417 is connected through the resistor 418 to the supply power line 47. The current outflow side of the constant-current source 417 is grounded. The operational amplifier 421 has its non-inverting input terminal (+) connected to the node between the constant-current source 417 and the resistor 418, and has its inverting input terminal (−) connected to the terminal 46C. The output terminal of the operational amplifier 421 is connected through the resistor 423 to the gate of the pMOS 403 belonging to the output circuit 41A. The pMOS 424 has its source connected to the supply power line 47, has its drain connected to the gate of the pMOS 403, and receives at its gate the voltage output from the controller 43.

The current inflow side of the constant-current source 425 is connected through the resistor 426 to the supply power line 47. The current outflow side of the constant-current source 425 is grounded. The operational amplifier 429 has its non-inverting input terminal (+) connected to the node between the constant-current source 425 and the resistor 426, and has its inverting input terminal (−) connected to the terminal 46D. The output terminal of the operational amplifier 429 is connected through the resistor 431 to the gate of the pMOS 405 belonging to the output circuit 41B. The pMOS 432 has its source connected to the supply power line 47, has its drain connected to the gate of the pMOS 405, and receives at its gate the voltage output from the controller 43.

The current inflow side of the constant-current source 433 is connected through the resistor 434 to the supply power line 47. The current outflow side of the constant-current source 433 is grounded. The operational amplifier 437 has its non-inverting input terminal (+) connected to the node between the constant-current source 433 and the resistor 434, and has its inverting input terminal (−) connected to the terminal 46D. The output terminal of the operational amplifier 437 is connected through the resistor 439 to the gate of the pMOS 407 belonging to the output circuit 41B. The pMOS 440 has its source connected to the supply power line 47, has its drain connected to the gate of the pMOS 407, and receives at its gate the voltage output from the controller 43.

In accordance with instructions fed from the controller 2 of the entire FDD, the controller 43 controls the voltages applied to the gates of the nMOSs 402 and 404 belonging to the output circuit 41A, the nMOSs 406 and 408 belonging to the output circuit 41B, the pMOSs 416 and 424 belonging to the current limiter circuit 42A, and pMOSs 432 and 440 belonging to the current limiter circuit 42B.

Figure 3:
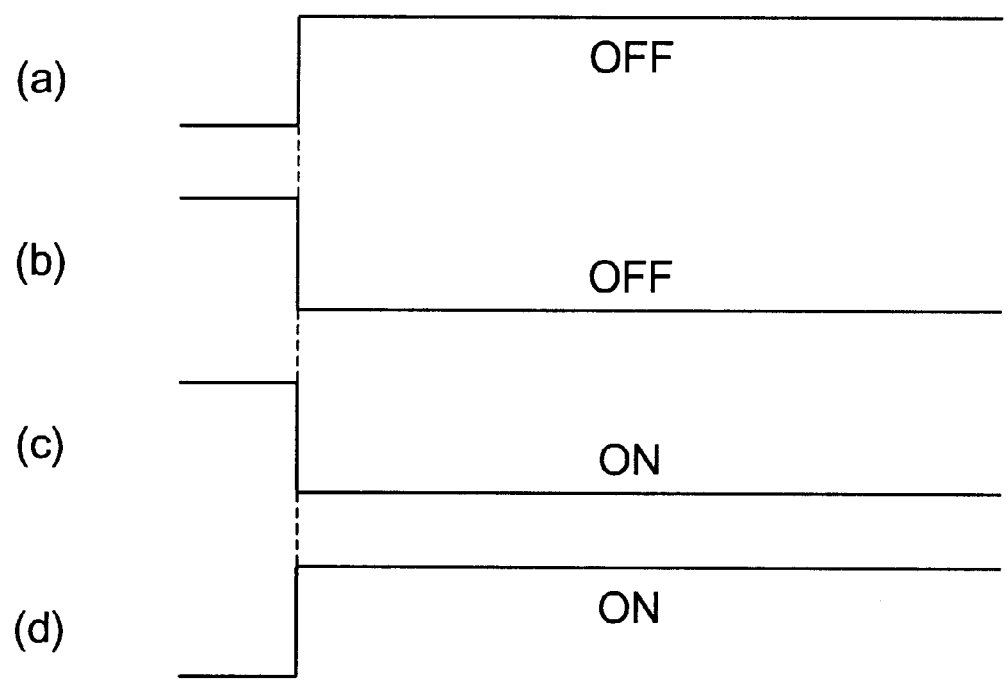
FIG. 3 is a diagram showing the timing with which the individual transistors constituting the output circuits of the stepping motor driver shown in FIG. 2 are turned on/off.

Specifically, when a current starts being supplied to the coil 45A in the direction indicated by the arrow 201 in FIG. 2, the voltages applied to the gates of the pMOS 416, nMOS 402, pMOS 424, and nMOS 404 are varied as shown at (a), (b), (c), and (d), respectively, in FIG. 3. That is, the controller 43 controls those voltages in such a way that the pMOS 416, nMOS 402, pMOS 424, and nMOS 404 are turned off, off, on, and on respectively.

When a current starts being supplied to the coil 45A in the direction indicated by the arrow 202 in FIG. 2, the voltages applied to the gates of the pMOS 424, nMOS 404, pMOS 416, and NMOS 402 are varied in the same manner as, when a current is supplied to the coil 45A in the direction indicated by the arrow 201 in FIG. 2, the pMOS 416, nMOS 402, pMOS 424, and nMOS 404, respectively, are turned on/off.

When a current starts being supplied to the coil 45B in the direction indicated by the arrow 203 in FIG. 2, the voltages applied to the gates of the pMOS 432, NMOS 406, pMOS 440, and nMOS 408 are varied in the same manner as, when a current is supplied to the coil 45A in the direction indicated by the arrow 201 in FIG. 2, the pMOS 416, nMOS 402, pMOS 424, and nMOS 404, respectively, are turned on/off.

When a current starts being supplied to the coil 45B in the direction indicated by the arrow 204 in FIG. 2, the voltages applied to the gates of the pMOS 440, nMOS 408, pMOS 432, and nMOS 406 are varied in the same manner as, when a current is supplied to the coil 45A in the direction indicated by the arrow 201 in FIG. 2, the pMOS 416, nMOS 402, pMOS 424, and nMOS 404, respectively, are turned on/off.

In this circuit configuration, for example, if the current that flows through the coil 45A in the direction indicated by the arrow 201 in FIG. 2 is considered, this current is converted into a voltage by the resistor 44A and is then fed to the inverting input terminal (−) of the operational amplifier 413. When this current is supplied to the coil 45A in the direction indicated by the arrow 201 in FIG. 2, the pMOS 416 is turned off, and the output voltage of the operational amplifier 413 is applied to the gate of the pMOS 401. In this way, the current flowing through the coil 45A in the direction indicated by the arrow 201 in FIG. 2 is negatively fed back.

The target value of the negative feedback control of the current flowing through the coil 45A in the direction indicated by the arrow 201 in FIG. 2 is set to be the value of a current that can flow only when the pMOS 401 is in a non-saturated state. As a result, the current flowing through the coil 45A in the direction indicated by the arrow 201 in FIG. 2 is so limited as not to become higher than the target value of its negative feedback control.

The current flowing through the coil 45A in the direction indicated by the arrow 202 in FIG. 2, the current flowing through the coil 45B in the direction indicated by the arrow 203 in FIG. 2, and the current flowing through the coil 45B in the direction indicated by the arrow 204 in FIG. 2 are limited in the same manner as the current flowing through the coil 45A in the direction indicated by the arrow 201 in FIG. 2.

As described above, in this embodiment, the currents that flow through the individual coils are negatively fed back individually. This eliminates the type of problem in which, although the current flowing through the motor as a whole appears normal, actually an abnormal current is flowing through the coil of one phase of the motor as experienced in cases where negative feedback control is achieved on the basis of the current flowing through the motor as a whole. As a result, it is possible to drive the stepping motor with satisfactory accuracy. Moreover, as compared with cases where negative feedback control is achieved on the basis of the current flowing through the motor as a whole, it is possible to minimize the effect of the resistances of conductors on the feedback factor, and thereby reduce problems resulting from the fact that the resistances of conductors vary from one IC chip to another.

Figure 4:
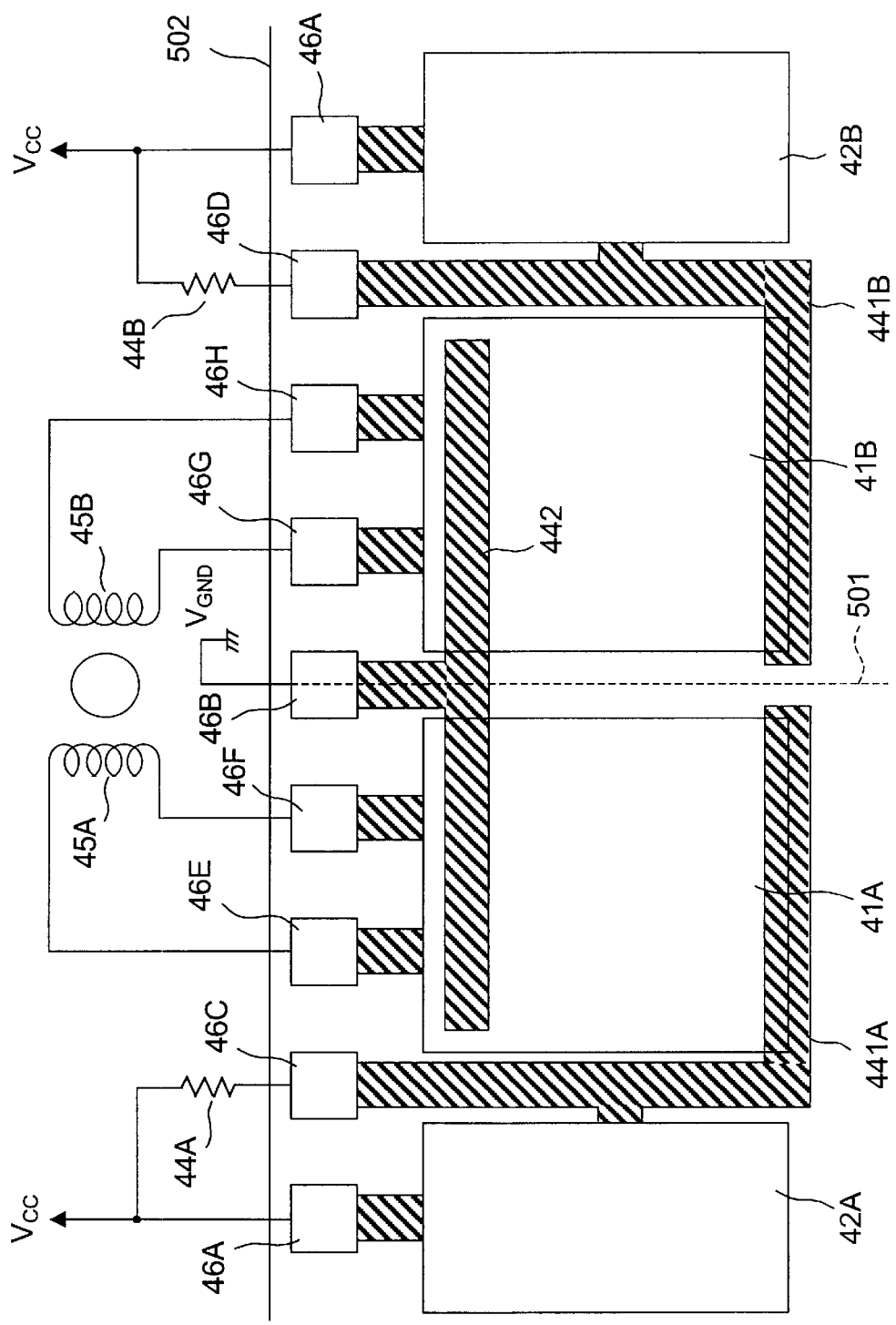
FIG. 4 is a plan view of the stepping motor driver shown in FIG. 2.

FIG. 4 shows a plan view and a connection diagram of the stepping motor driver 4 configured as shown in FIG. 2. The output circuits 41A and 41B are arranged symmetrically about an imaginary line indicated by a broken line 501 in the figure. The current limiter circuits 42A and 42B are arranged so as to face each other across the output circuits 41A and 41B and symmetrically about the broken line 501.

The terminal 46C, which is connected through the current detection resistor 44A to the supply voltage $V_{CC}$ outside the stepping motor driver 4, is formed near the edge 502 of the chip between the output circuit 41A and the current limiter circuit 42A. The terminal 46D, which is connected through the current detection resistor 44B to the supply voltage $V_{CC}$ outside the stepping motor driver 4, is formed near the edge 502 of the chip between the output circuit 41B and the current limiter circuit 42B. The terminals 46C and 46D are arranged symmetrically about the broken line 501. The terminal 46B, which is connected to ground $V_{GND}$ outside the stepping motor driver 4, is formed near the edge 502 of the chip equidistantly from the output circuits 41A and 41B. In this embodiment, the current limiter circuits 42A and 42B are arranged apart from each other, and accordingly, as the terminal 46A, two terminals are provided that are connected together to the supply voltage $V_{CC}$ outside the stepping motor driver 4.

The output circuit 41A is connected to the terminal 46C by an L-shaped conductor 441A that is formed so as to run between the output circuit 41A and the current limiter circuit 42A and then cover that side of the output circuit 41A which faces the inner portion of the chip. The output circuit 41B is connected to the terminal 46D by a turned-around L-shaped conductor 441B that is formed so as to run between the output circuit 41B and the current limiter circuit 42B and then cover that side of the output circuit 41B which faces the inner portion of the chip. The conductors 441A and 441B are formed symmetrically about the broken line 501. The output circuits 41A and 41B are connected together to the terminal 46B by an inverted T-shaped conductor 442 that is formed symmetrically about the broken line 501.

In this layout, the length of the conductor that connects the output circuit 41A to the terminal 46C is equal to the length of the conductor that connects the output circuit 41B to the terminal 46D, and moreover the length of the conductor that connects the output circuit 41A to the terminal 46B is equal to the length of the conductor that connects the output circuit 41B to the terminal 46B. Thus, the resistances of the conductors from the output circuits 41A and 41B to the supply power terminals are substantially equal. On the other hand, the supply power conductors laid outside the IC chip can be made thicker than those inside the IC chip so as to have lower resistances. In this way, it is possible to minimize the difference between the current flowing through the coil 45A and the current flowing through the coil 45B.

Moreover, the switching noise that is generated within the output circuits 41A and 41B is shielded by the conductors 441A and 441B and by the diffusion layer that connects them to the substrate below. This reduces the adverse effect of noise on the limiter circuits 42A and 42B and other circuits formed within the chip.

It is to be understood that, in a driver designed for the driving of a stepping motor having an even number of coils greater than four, the layout described above is applied to the portion of the driver related to every two coils. On the other hand, in a driver designed for the driving of a stepping motor having an odd number of coils greater than three, the layout described above is applied to the portion of the driver related to every two coils, and then the layout for the portion of the driver related to the remaining one coil is designed under the same conditions.

Figure 5:
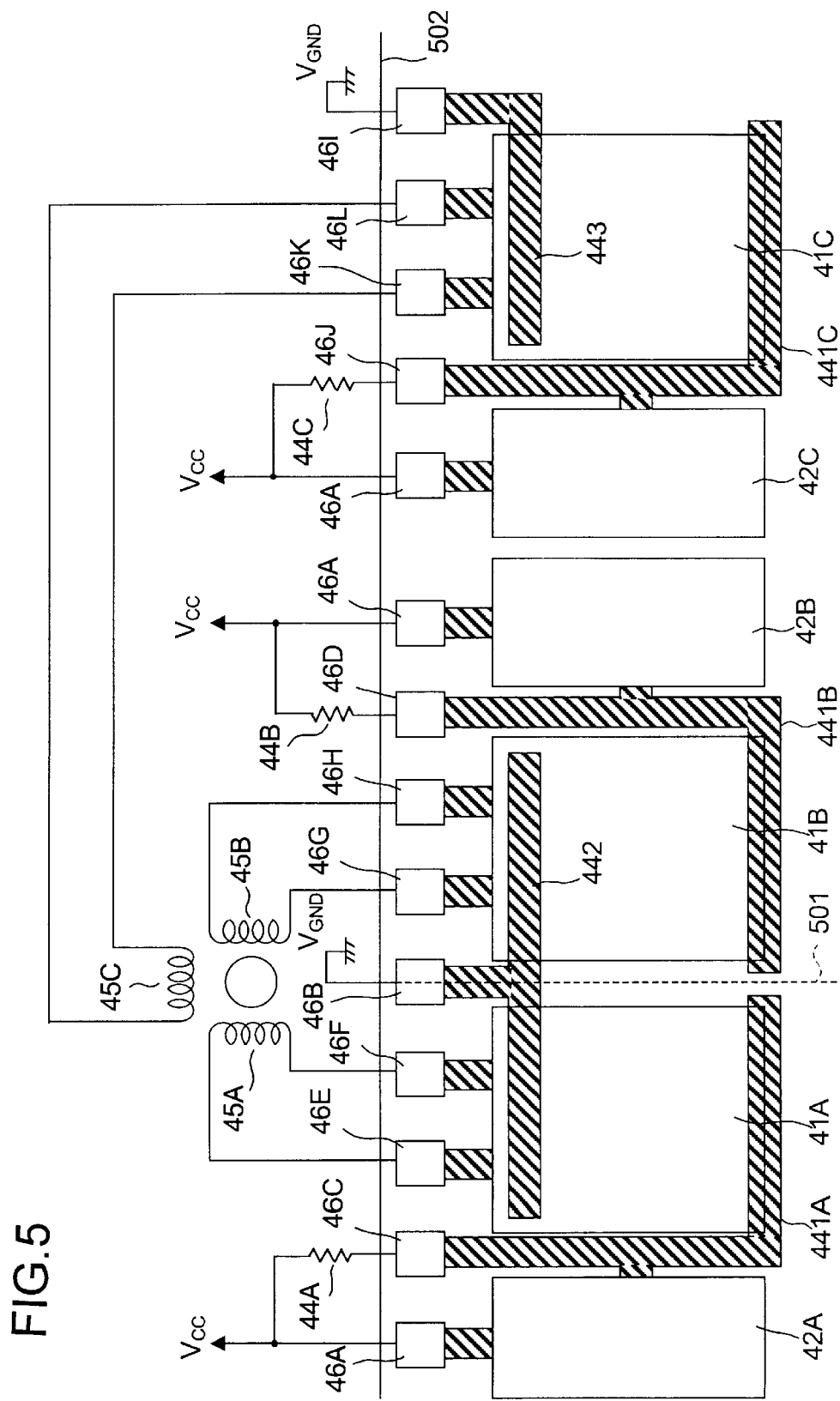
FIG. 5 is a plan view of a stepping motor driver embodying the invention designed for the driving of a stepping motor having three coils.

For example, in a stepping motor driver designed for the driving of a stepping motor having three coils 45A, 45B, and 45C, as shown in a plan view in FIG. 5, the layout for the output circuits 41A and 41B and the current limiter circuits 42A and 42B that are related to the coils 45A and 45B, respectively, are designed just as described above, and the layout for another output circuit 41C and another current limiter circuit 52C that are related to the coil 45C is designed in the following manner. The current limiter circuit 42C is arranged on the right of the current limiter circuit 42B, and the output circuit 41C is arranged on the right of the current limiter circuit 42C. A terminal 46J that is connected through a resistor 44C, for detecting the current flowing through the coil 45C, to the supply voltage $V_{CC}$ outside the stepping motor driver is formed near the edge 502 of the chip between the output circuit 41C and the current limiter circuit 42C. A conductor 441C that connects the output circuit 41C to the terminal 46J is formed in the same shape as the conductor 441A. A terminal 461 that is connected to ground $V_{GND}$ outside the stepping motor driver and a conductor 443 that connects the output circuit 41C to the terminal 461 are formed in such a way that the conductor 443 has the same length as the conductors that connect the output circuits 41A and 41B to the terminal 46B.

In FIG. 5, the circuits (the output circuit 41C and the current limiter circuit 42C) related to the coil 45C are formed on the right of the circuits (the output circuit 41B and the current limiter circuit 42B) related to the coil 45B so as to have the same layout as the circuits (the output circuit 41A and the current limiter circuit 42A) related to the coil 45A. Alternatively, the circuits related to the coil 45C may be designed to have the same layout as the circuits related to the coil 45B.

Figure 6:
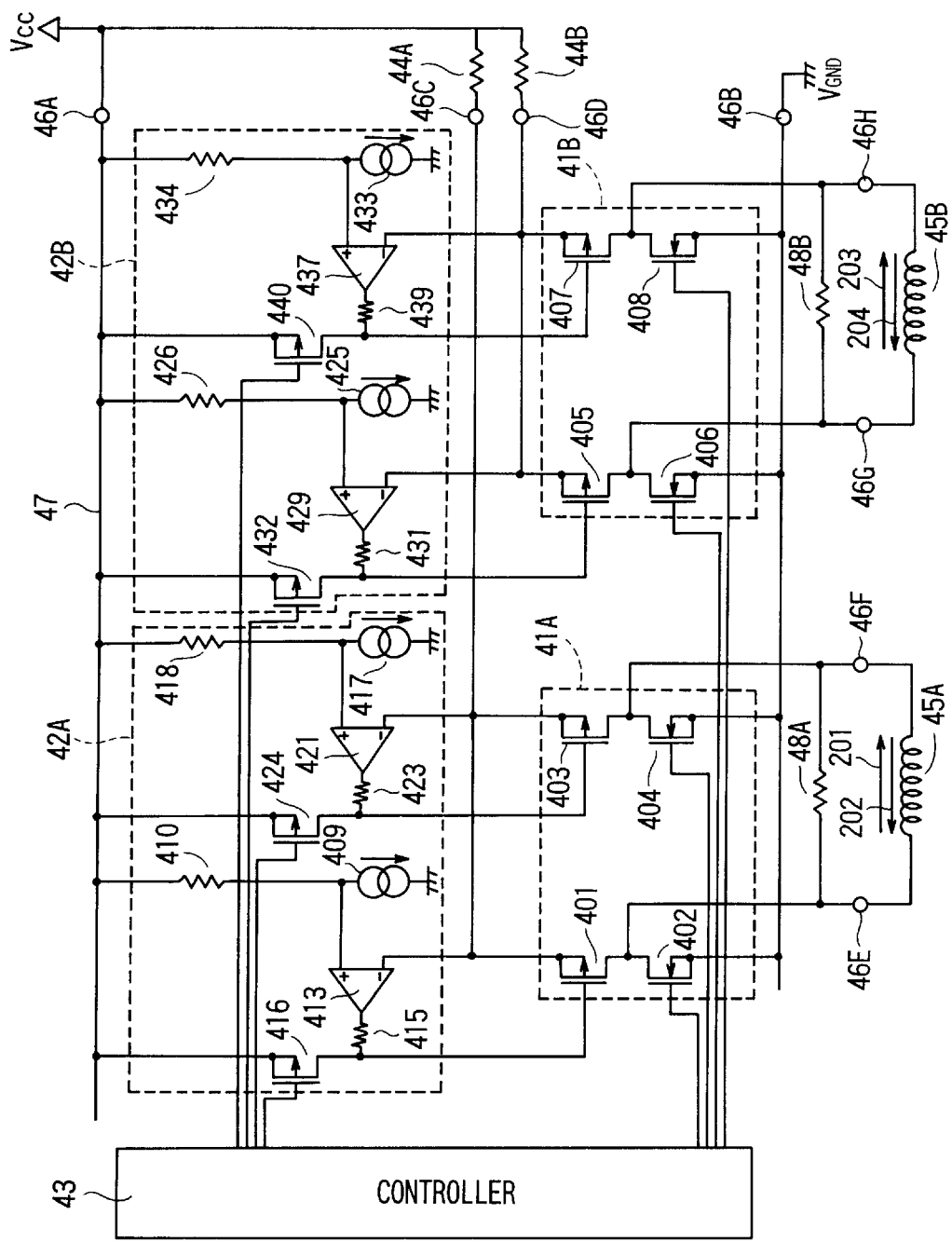
FIG. 6 is a circuit diagram of another example of a stepping motor driver embodying the invention.

FIG. 6 shows a circuit diagram of another example of the stepping motor driver 4. In this figure, reference numerals 48A and 48B represent damping resistors. Here, such circuit elements as are found also in the circuit configuration shown in FIG. 2 are identified with the same reference numerals, and their explanations will not be repeated. The damping resistor 48A is connected between the terminals 46E and 46F between which the coil 45A of the stepping motor is connected, and the damping resistor 48B is connected between the terminals 46G and 46H between which the coil 45B of the stepping motor is connected.

Here, the damping resistors 48A and 48B are given a resistance not so high as to hinder the driving of the stepping motor. For example, whereas the coils 45A and 45B of the stepping motor have a resistance of several tens of ohms, the damping resistors 48A and 48B are given a resistance of several tens of kilohms.

In this way, in the circuit configuration shown in FIG. 6, not only the currents flowing through the coils of the stepping motor are negatively fed back, but also damping resistors 48A and 48B are connected, respectively, between the terminals 46E and 46F between which the coil 45A of the stepping motor is connected and between the terminals 46G and 46H between which the coil 45B of the stepping motor is connected. As a result, the currents flowing through the coils of the stepping motor vary more gradually than in a circuit configuration without damping resistors 48A and 48B. This suppresses overshooting and oscillation in the currents flowing through the coils and oscillation in the voltages across the coils, and thereby reduces noise. Thus, this circuit configuration can be used in electronic devices that need to meet strict requirements with respect to their current consumption (for example, electronic devices that comply with the USB standard).

Figure 7:
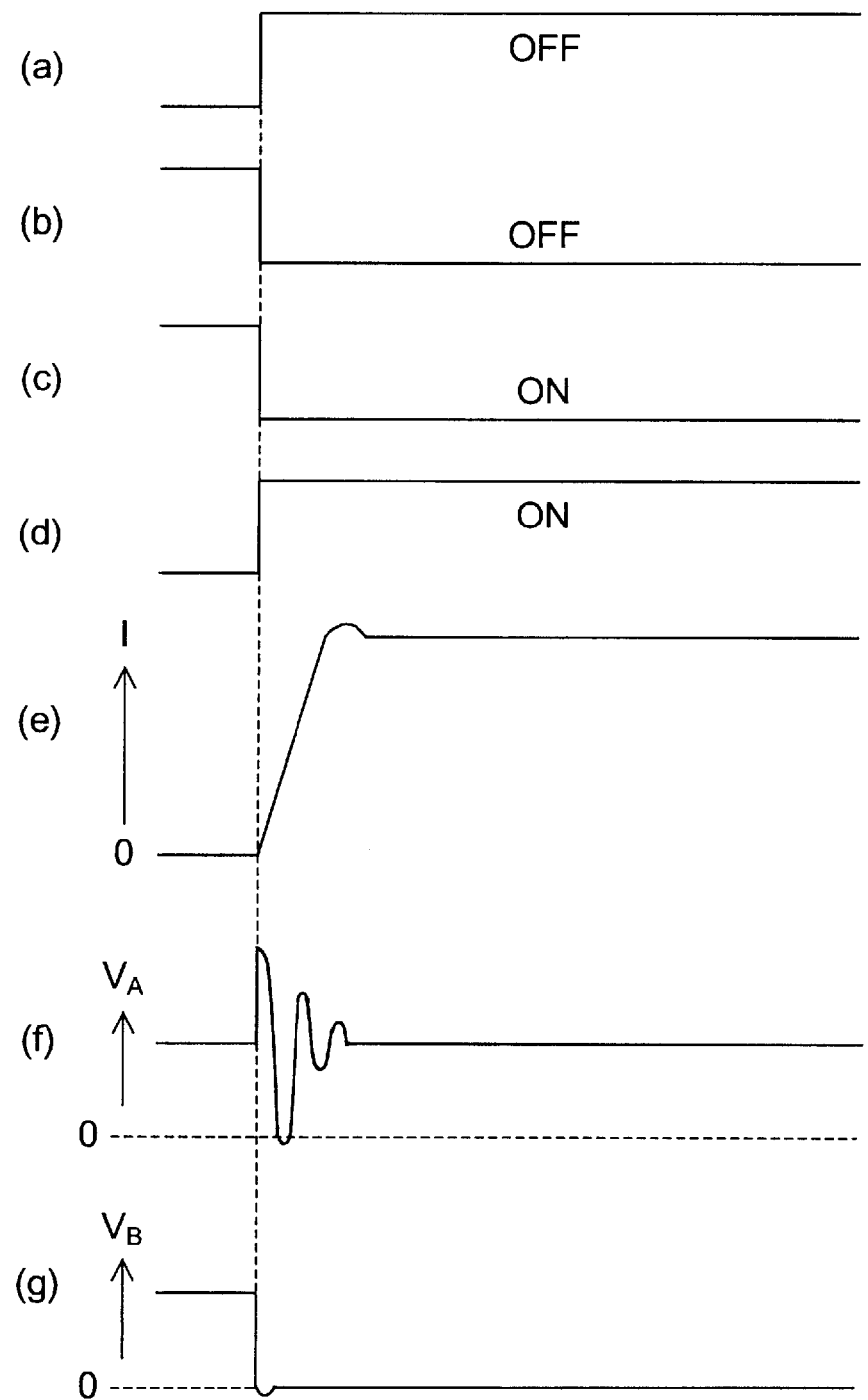
FIG. 7 is a diagram showing the timing with which the individual transistors constituting the output circuits of the stepping motor driver shown in FIG. 6 are turned on/off, the waveform of the currents flowing through the coils of the motor, and the waveforms of the voltages across the coils of the motor.

For example, when the voltages applied to the gates of the pMOS 416, nMOS 402, pMOS 424, and nMOS 404 vary as shown at (a), (b), (c), and (d), respectively, in FIG. 7, then the current I flowing through the coil 45A in the direction indicated by the arrow 201 in FIG. 6 and the voltages $V_A$ and $V_B$ at one and the other terminals, respectively, of the coil 45A have waveforms as shown at (e), (f), and (g), respectively, in FIG. 7.

Moreover, incorporating the damping resistors 48A and 48B in this way makes it possible to conduct simple tests, for example to check the on/off operations of the transistors constituting the output circuits 41A and 41B, even when the coils 45A and 45B of the stepping motor are not connected to the stepping motor driver.

Figure 8:
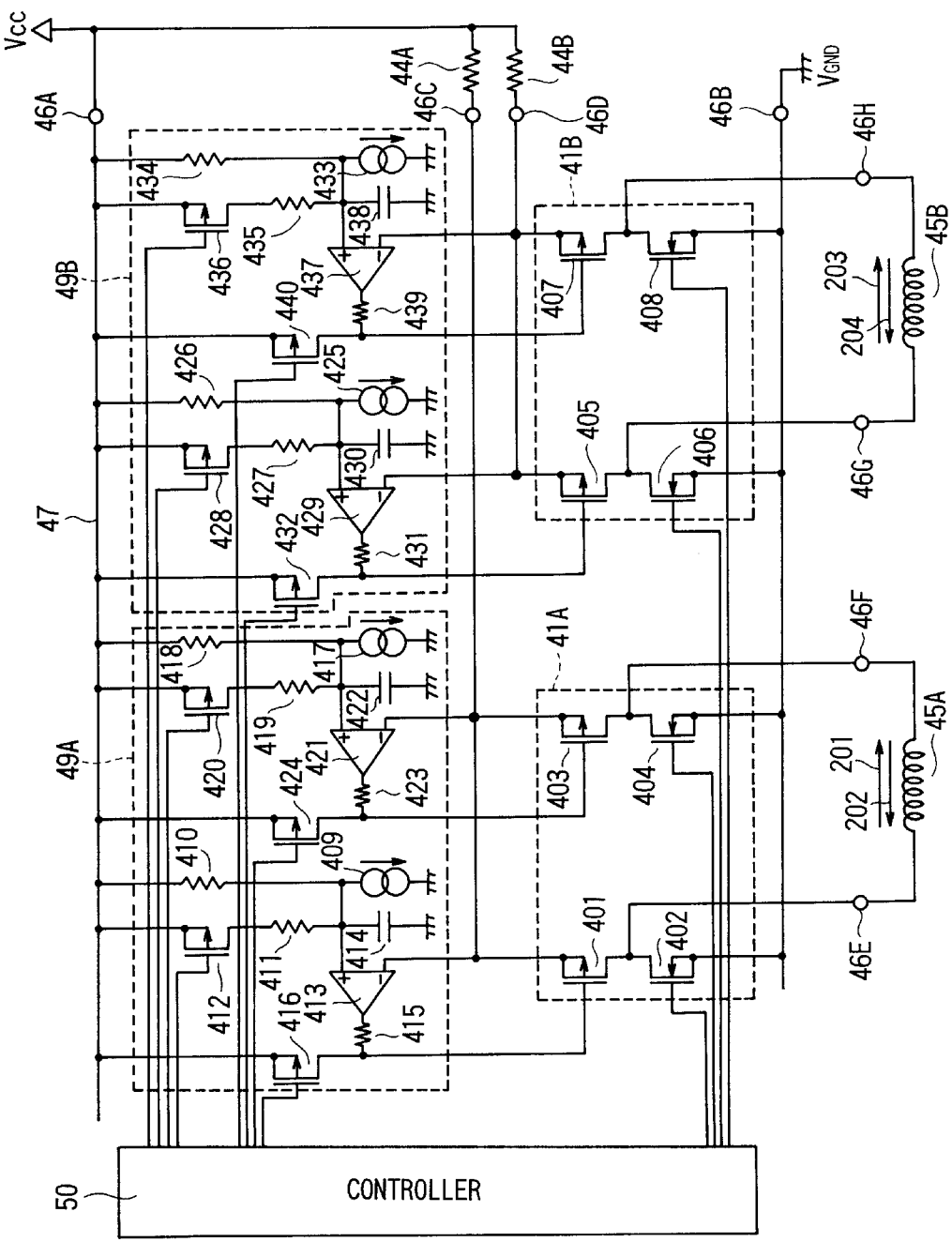
FIG. 8 is a circuit diagram of still another example of a stepping motor driver embodying the invention.

FIG. 8 shows a circuit diagram of still another example of the stepping motor driver 4. In this figure, reference numerals 49A and 49B represent current limiter circuits, and reference numeral 50 represents a controller. Here, such circuit elements as are found also in the circuit configuration shown in FIG. 2 are identified with the same reference numerals, and their explanations will not be repeated.

The current limiter circuit 49A is composed of a constant-current source 409, a resistor 410, a resistor 411, a pMOS 412, an operational amplifier 413, a capacitor 414, a resistor 415, a pMOS 416, a current limiter circuit 417, a resistor 418, a resistor 419, a pMOS 420, an operational amplifier 421, a capacitor 422, a resistor 423, and a pMOS 424.

The current limiter circuit 49B is composed of a constant-current source 425, a resistor 426, a resistor 427, a pMOS 428, an operational amplifier 429, a capacitor 430, a resistor 431, a pMOS 432, a current limiter circuit 433, a resistor 434, a resistor 435, a pMOS 436, an operational amplifier 437, a capacitor 438, a resistor 439, and a pMOS 440.

Now, how these elements are interconnected will be described. Here, such elements as are found also in the current limiter circuits 42A and 42B shown in FIG. 2 are identified with the same reference numerals, and their explanations will not be repeated. The non-inverting input terminal (+) of the operational amplifier 413 is, on one hand, connected through the resistor 411 to the drain of the pMOS 412, of which the source is connected to the supply power line 47, and, on the other hand, grounded through the capacitor 414. The pMOSs 412 and 416 receive at their gates the voltage output from the controller 50.

The non-inverting input terminal (+) of the operational amplifier 421 is, on one hand, connected through the resistor 419 to the drain of the pMOS 420, of which the source is connected to the supply power line 47, and, on the other hand, grounded through the capacitor 422. The pMOSs 420 and 424 receive at their gates the voltage output from the controller 50.

The non-inverting input terminal (+) of the operational amplifier 429 is, on one hand, connected through the resistor 427 to the drain of the pMOS 428, of which the source is connected to the supply power line 47, and, on the other hand, grounded through the capacitor 430. The pMOSs 428 and 432 receive at their gates the voltage output from the controller 50.

The non-inverting input terminal (+) of the operational amplifier 437 is, on one hand, connected through the resistor 435 to the drain of the pMOS 436, of which the source is connected to the supply power line 47, and, on the other hand, grounded through the capacitor 438. The pMOSs 436 and 440 receive at their gates the voltage output from the controller 50.

In this circuit configuration, for example, when a current flows through the coil 45A in the direction indicated by the arrow 201 in FIG. 8, this current flowing through the coil 45A is converted into a voltage by the resistor 44A and is then fed to the inverting input terminal (−) of the operational amplifier 413. Meanwhile, as will be described later, the pMOS 416 remains off, and the output voltage of the operational amplifier 413 is applied to the gate of the pMOS 401. In this way, only the voltage commensurate with the current flowing through the coil 45A in the direction indicated by the arrow 201 in FIG. 8 is negatively fed back.

The voltage fed to the non-inverting input terminal (+) of the operational amplifier 413 is higher when the pMOS 412 is on than when the pMOS 412 is off, and therefore the target value of the current that is negatively fed back is smaller when the pMOS 412 is on than when the pMOS 412 is off. When the pMOS 412 is switched between on and off, it takes time to charge or discharge the capacitor 414, and therefore the target value of the current that is negatively fed back varies gradually (not abruptly).

Thus, there exist two target values for the current that is negatively fed back. Of these two target values, the greater is set to be the value of a current that can flow only when the pMOS 401 is in a non-saturated state. As a result, the current flowing through the coil 45A in the direction indicated by the arrow 201 in FIG. 8 is so limited as not to become higher than the target value of its negative feedback control. In the following descriptions, the target value of the current that is negatively fed back is referred to as the "current limit value."

The current that flows through the coil 45A in the direction indicated by the arrow 202 in FIG. 8, the current that flows through the coil 45B in the direction indicated by the arrow 203 in FIG. 8, and the current that flows through the coil 45B in the direction indicated by the arrow 204 in FIG. 8 are limited in the same manner, and their respective current limit values are each switched between two values as the pMOSs 420, 428, and 436, respectively, are turned on/off.

In accordance with instructions fed from the controller 2 of the entire FDD, the controller 50 controls the voltages applied to the gates of the nMOSs 402 and 404 belonging to the output circuit 41A, the nMOSs 406 and 408 belonging to the output circuit 41B, the pMOSs 412, 416, 420, and 424 belonging to the current limiter circuit 49A, and pMOSs 428, 432, 436, and 440 belonging to the current limiter circuit 49B.

Now, three examples of how the controller 50 operates will be described. In the first example, when a current starts being supplied to the coil 45A in the direction indicated by the arrow 201 in FIG. 8, the voltages applied to the gates of the pMOS 416, nMOS 402, pMOS 424, nMOS 404, and pMOS 412 are varied as shown at (a), (b), (c), (d), and (e), respectively, in FIG. 9. That is, the controller 50 controls those voltages in such a way that, first with the pMOS 412 on, the pMOS 416, nMOS 402, pMOS 424, and nMOS 404 are turned off, off, on, and on, respectively, and, a time period T1 thereafter, the pMOS 412 is turned from on to off. Here, the pMOS 412 has been turned from off to on with appropriate timing so that, before a current starts being supplied to the coil 45A in the direction indicated by the arrow 201 in FIG. 8, the current limit value of this current has dropped to its minimum value.

When a current starts being supplied to the coil 45A in the direction indicated by the arrow 202 in FIG. 8, the voltages applied to the gates of the pMOS 424, nMOS 404, pMOS 416, nMOS 402, and pMOS 420 are varied in the same manner as, when a current is supplied to the coil 45A in the direction indicated by the arrow 201 in FIG. 8, the pMOS 416, nMOS 402, pMOS 424, nMOS 404, and pMOS 412, respectively, are turned on/off. Here, the pMOS 420 has been turned from off to on with appropriate timing so that, before a current starts being supplied to the coil 45A in the direction indicated by the arrow 202 in FIG. 8, the current limit value of this current has dropped to its minimum value.

When a current starts being supplied to the coil 45B in the direction indicated by the arrow 203 in FIG. 8, the voltages applied to the gates of the pMOS 432, nMOS 406, pMOS 440, nMOS 408, and pMOS 428 are varied in the same manner as, when a current is supplied to the coil 45A in the direction indicated by the arrow 201 in FIG. 8, the pMOS 416, nMOS 402, pMOS 424, nMOS 404, and pMOS 412, respectively, are turned on/off. Here, the pMOS 428 has been turned from off to on with appropriate timing so that, before a current starts being supplied to the coil 45B in the direction indicated by the arrow 203 in FIG. 8, the current limit value of this current has dropped to its minimum value.

When a current starts being supplied to the coil 45B in the direction indicated by the arrow 204 in FIG. 8, the voltages applied to the gates of the pMOS 440, NMOS 408, pMOS 432, nMOS 406, and pMOS 436 are varied in the same manner as, when a current is supplied to the coil 45A in the direction indicated by the arrow 201 in FIG. 8, the pMOS 416, nMOS 402, pMOS 424, nMOS 404, and pMOS 412, respectively, are turned on/off. Here, the pMOS 436 has been turned from off to on with appropriate timing so that, before a current starts being supplied to the coil 45B in the direction indicated by the arrow 204 in FIG. 8, the current limit value of this current has dropped to its minimum value.

Figure 9:
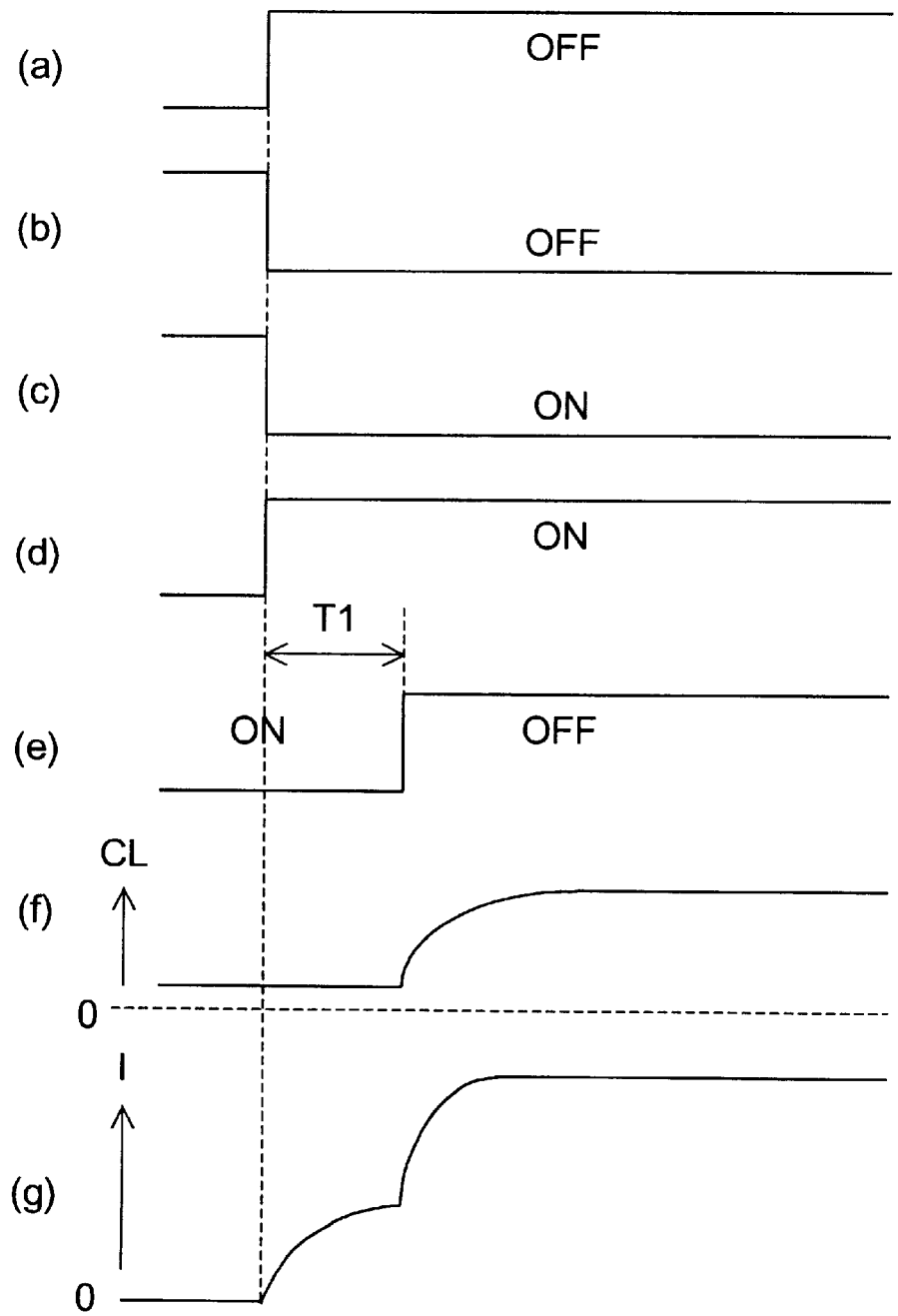
FIG. 9 is a diagram showing an example of the timing with which the individual transistors constituting the output circuits of the stepping motor driver shown in FIG. 8 are turned on/off, and how the current limit value and the currents flowing through the coils of the motor vary as a result.

In this example, after a current starts being supplied to the coil, the current limit value starts rising from its minimum value (for example, the current limit value CL of the current that flows through the coil 45A in the direction indicated by the arrow 201 in FIG. 8 varies as shown at (f) in FIG. 9). As a result, the current flowing through the coil increases more gradually than in a circuit configuration in which the current limit value is fixed at its maximum value before a current starts being supplied to the coil (for example, the current I that flows through the coil 45A in the direction indicated by the arrow 201 in FIG. 8 varies as shown at (g) in FIG. 9). As a result, as compared with the circuit configuration shown in FIG. 2, it is possible to further suppress overshooting and oscillation in the currents flowing through the coils and oscillation in the voltages across the coils, and thereby further reduce noise.

Figure 10:
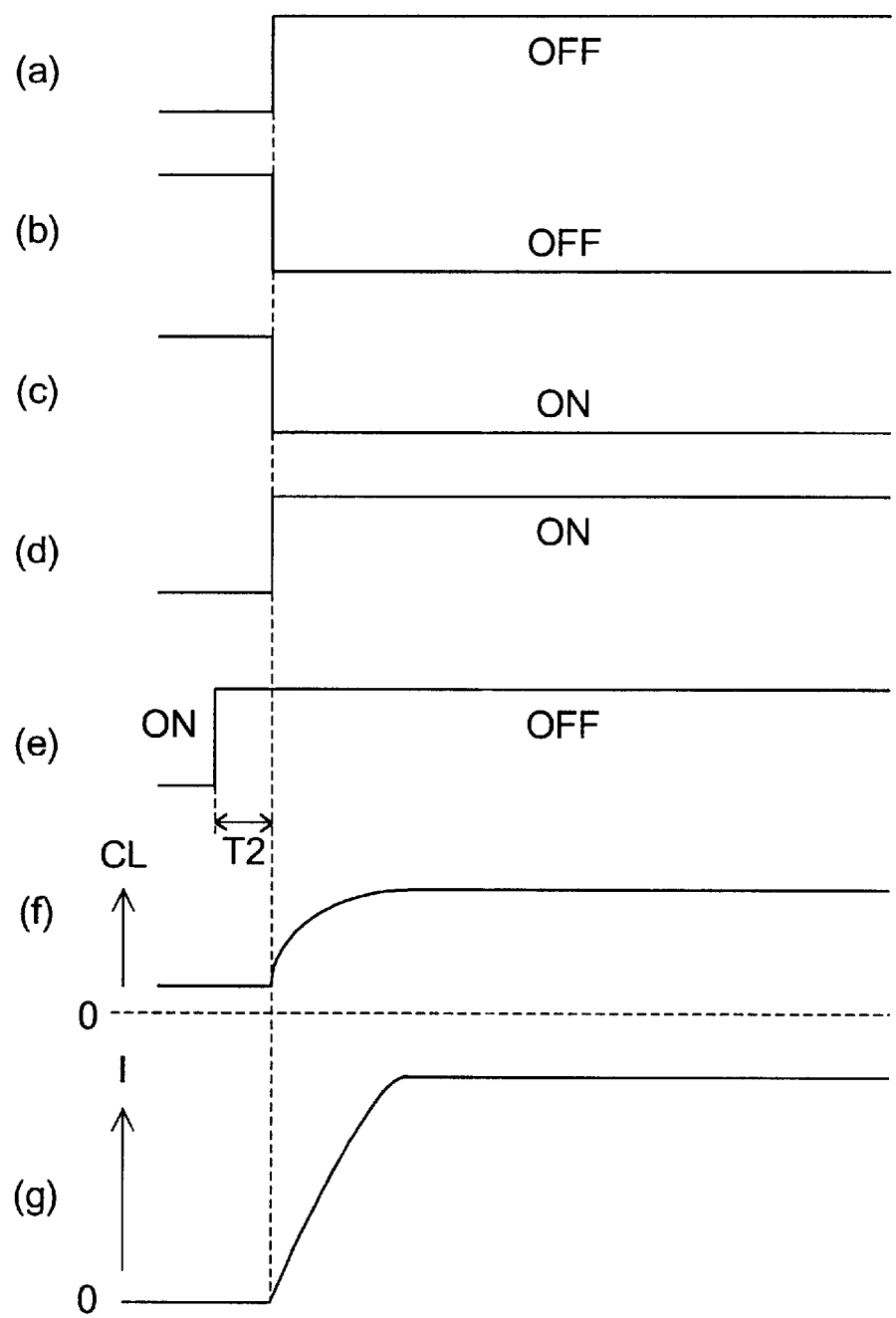
FIG. 10 is a diagram showing another example of the timing with which the individual transistors constituting the output circuits of the stepping motor driver shown in FIG. 8 are turned on/off, and how the current limit value and the currents flowing through the coils of the motor vary as a result.

In the second example, when a current starts being supplied to the coil 45A in the direction indicated by the arrow 201 in FIG. 8, the voltages applied to the gates of the pMOS 416, nMOS 402, pMOS 424, nMOS 404, and pMOS 412 are varied as shown at (a), (b), (c), (d), and (e), respectively, in FIG. 10. That is, here, the pMOS 412 is turned from on to off earlier than in the example shown in FIG. 9. Specifically, the controller 50 controls those voltages in such a way that the pMOS 416, nMOS 402, pMOS 424, and nMOS 404 are turned off, off, on, and on, respectively, and simultaneously the pMOS 412 is turned from on to off. Here, the pMOS 412 has been turned from off to on with appropriate timing so that, before a current starts being supplied to the coil 45A in the direction indicated by the arrow 201 in FIG. 8, the current limit value of this current has dropped to its minimum value.

When a current starts being supplied to the coil 45A in the direction indicated by the arrow 202 in FIG. 8, the voltages applied to the gates of the pMOS 424, nMOS 404, pMOS 416, nMOS 402, and pMOS 420 are varied in the same manner as, when a current is supplied to the coil 45A in the direction indicated by the arrow 201 in FIG. 8, the pMOS 416, nMOS 402, pMOS 424, nMOS 404, and pMOS 412, respectively, are turned on/off. Here, the pMOS 420 has been turned from off to on with appropriate timing so that, before a current starts being supplied to the coil 45A in the direction indicated by the arrow 202 in FIG. 8, the current limit value of this current has dropped to its minimum value.

When a current starts being supplied to the coil 45B in the direction indicated by the arrow 203 in FIG. 8, the voltages applied to the gates of the pMOS 432, nMOS 406, pMOS 440, nMOS 408, and pMOS 428 are varied in the same manner as, when a current is supplied to the coil 45A in the direction indicated by the arrow 201 in FIG. 8, the pMOS 416, nMOS 402, pMOS 424, nMOS 404, and pMOS 412, respectively, are turned on/off. Here, the pMOS 428 has been turned from off to on with appropriate timing so that, before a current starts being supplied to the coil 45B in the direction indicated by the arrow 203 in FIG. 8, the current limit value of this current has dropped to its minimum value.

When a current starts being supplied to the coil 45B in the direction indicated by the arrow 204 in FIG. 8, the voltages applied to the gates of the pMOS 440, nMOS 408, pMOS 432, nMOS 406, and pMOS 436 are varied in the same manner as, when a current is supplied to the coil 45A in the direction indicated by the arrow 201 in FIG. 8, the pMOS 416, nMOS 402, pMOS 424, nMOS 404, and pMOS 412, respectively, are turned on/off. Here, the pMOS 436 has been turned from off to on with appropriate timing so that, before a current starts being supplied to the coil 45B in the direction indicated by the arrow 204 in FIG. 8, the current limit value of this current has dropped to its minimum value.

In this example, at the same time that a current starts being supplied to the coil, the current limit value starts rising from its minimum value (for example, the current limit value CL of the current that flows through the coil 45A in the direction indicated by the arrow 201 in FIG. 8 varies as shown at (f) in FIG. 10). As a result, the current flowing through the coil increases more gradually than in a circuit configuration in which the current limit value is fixed at its maximum value before a current starts being supplied to the coil (for example, the current I that flows through the coil 45A in the direction indicated by the arrow 201 in FIG. 8 varies as shown at (g) in FIG. 10). As a result, as compared with the circuit configuration shown in FIG. 2, it is possible to further suppress overshooting and oscillation in the currents flowing through the coils and oscillation in the voltages across the coils, and thereby further reduce noise.

Figure 11:
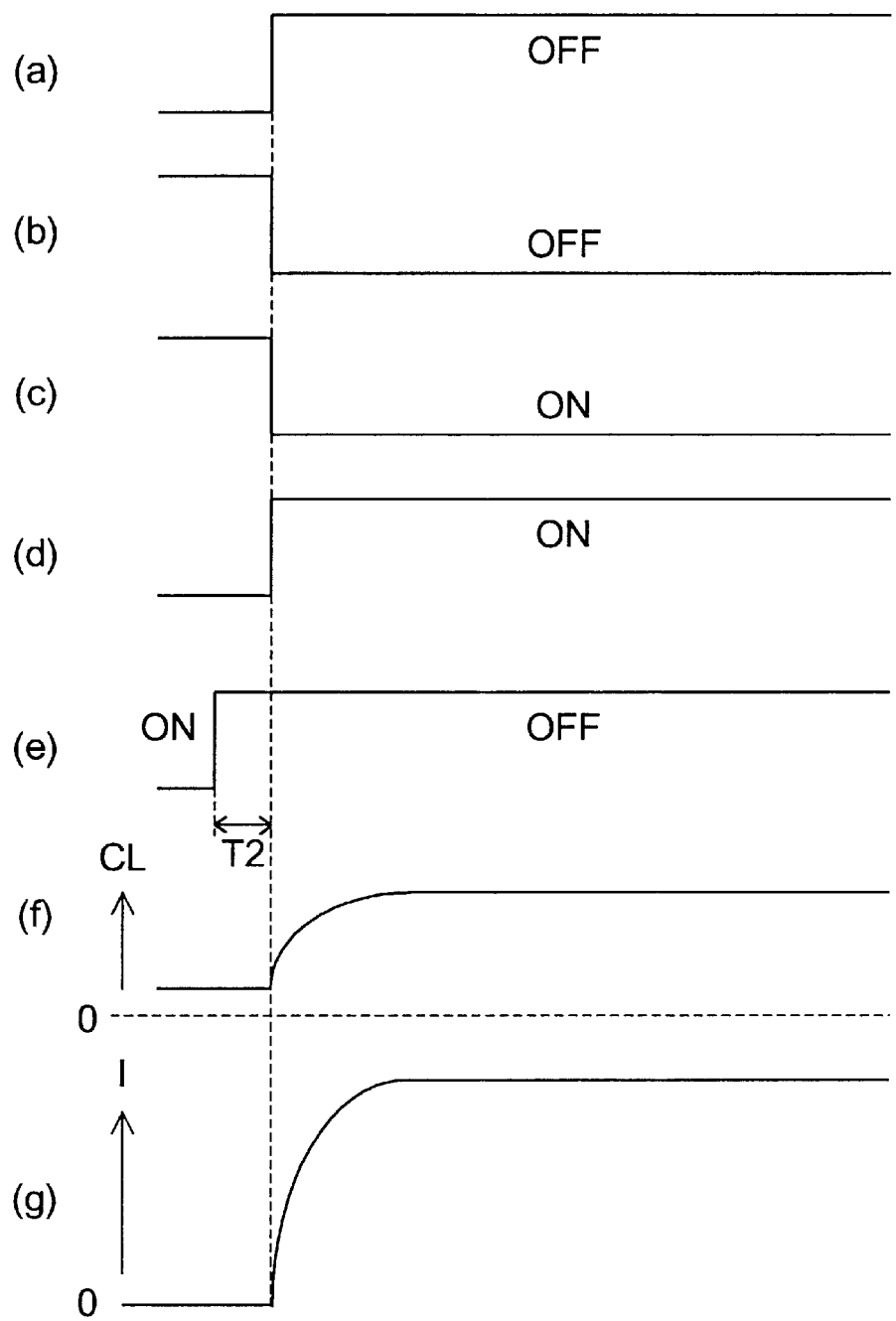
FIG. 11 is a diagram showing still another example of the timing with which the individual transistors constituting the output circuits of the stepping motor driver shown in FIG. 8 are turned on/off, and how the current limit value and the currents flowing through the coils of the motor vary as a result.

In the third example, when a current starts being supplied to the coil 45A in the direction indicated by the arrow 201 in FIG. 8, the voltages applied to the gates of the pMOS 416, nMOS 402, pMOS 424, nMOS 404, and pMOS 412 are varied as shown at (a), (b), (c), (d), and (e), respectively, in FIG. 11. That is, here, the pMOS 412 is turned from on to off earlier than in the example shown in FIG. 10. Specifically, the controller 50 controls those voltages in such a way that the pMOS 416, nMOS 402, pMOS 424, and nMOS 404 are turned off, off, on, and on, respectively, and, a time period T2 before that, the pMOS 412 has been turned from on to off. Here, the pMOS 412 has been turned from off to on with appropriate timing so that, a time period T2 before a current starts being supplied to the coil 45A in the direction indicated by the arrow 201 in FIG. 8, the current limit value of this current has dropped to its minimum value.

When a current starts being supplied to the coil 45A in the direction indicated by the arrow 202 in FIG. 8, the voltages applied to the gates of the pMOS 424, nMOS 404, pMOS 416, nMOS 402, and pMOS 420 are varied in the same manner as, when a current is supplied to the coil 45A in the direction indicated by the arrow 201 in FIG. 8, the pMOS 416, nMOS 402, pMOS 424, nMOS 404, and pMOS 412, respectively, are turned on/off. Here, the pMOS 420 has been turned from off to on with appropriate timing so that, a time period T2 before a current starts being supplied to the coil 45A in the direction indicated by the arrow 202 in FIG. 8, the current limit value of this current has dropped to its minimum value.

When a current starts being supplied to the coil 45B in the direction indicated by the arrow 203 in FIG. 8, the voltages applied to the gates of the pMOS 432, nMOS 406, pMOS 440, nMOS 408, and pMOS 428 are varied in the same manner as, when a current is supplied to the coil 45A in the direction indicated by the arrow 201 in FIG. 8, the pMOS 416, nMOS 402, pMOS 424, nMOS 404, and pMOS 412, respectively, are turned on/off. Here, the pMOS 428 has been turned from off to on with appropriate timing so that, a time period T2 before a current starts being supplied to the coil 45B in the direction indicated by the arrow 203 in FIG. 8, the current limit value of this current has dropped to its minimum value.

When a current starts being supplied to the coil 45B in the direction indicated by the arrow 204 in FIG. 8, the voltages applied to the gates of the pMOS 440, nMOS 408, pMOS 432, nMOS 406, and pMOS 436 are varied in the same manner as, when a current is supplied to the coil 45A in the direction indicated by the arrow 201 in FIG. 8, the pMOS 416, nMOS 402, pMOS 424, nMOS 404, and pMOS 412, respectively, are turned on/off. Here, the pMOS 436 has been turned from off to on with appropriate timing so that, a time period T2 before a current starts being supplied to the coil 45B in the direction indicated by the arrow 204 in FIG. 8, the current limit value of this current has dropped to its minimum value.

In this example, before a current starts being supplied to the coil, the current limit value starts rising from its minimum value and, after a current starts being supplied to the coil, the current limit value reaches its maximum value (for example, the current limit value CL of the current that flows through the coil 45A in the direction indicated by the arrow 201 in FIG. 8 varies as shown at (f) in FIG. 11). As a result, the current flowing through the coil increases more gradually than in a circuit configuration in which the current limit value is fixed at its maximum value before a current starts being supplied to the coil (for example, the current I that flows through the coil 45A in the direction indicated by the arrow 201 in FIG. 8 varies as shown at (g) in FIG. 11). As a result, as compared with the circuit configuration shown in FIG. 2, it is possible to further suppress overshooting and oscillation in the currents flowing through the coils and oscillation in the voltages across the coils, and thereby further reduce noise.

Figure 12:
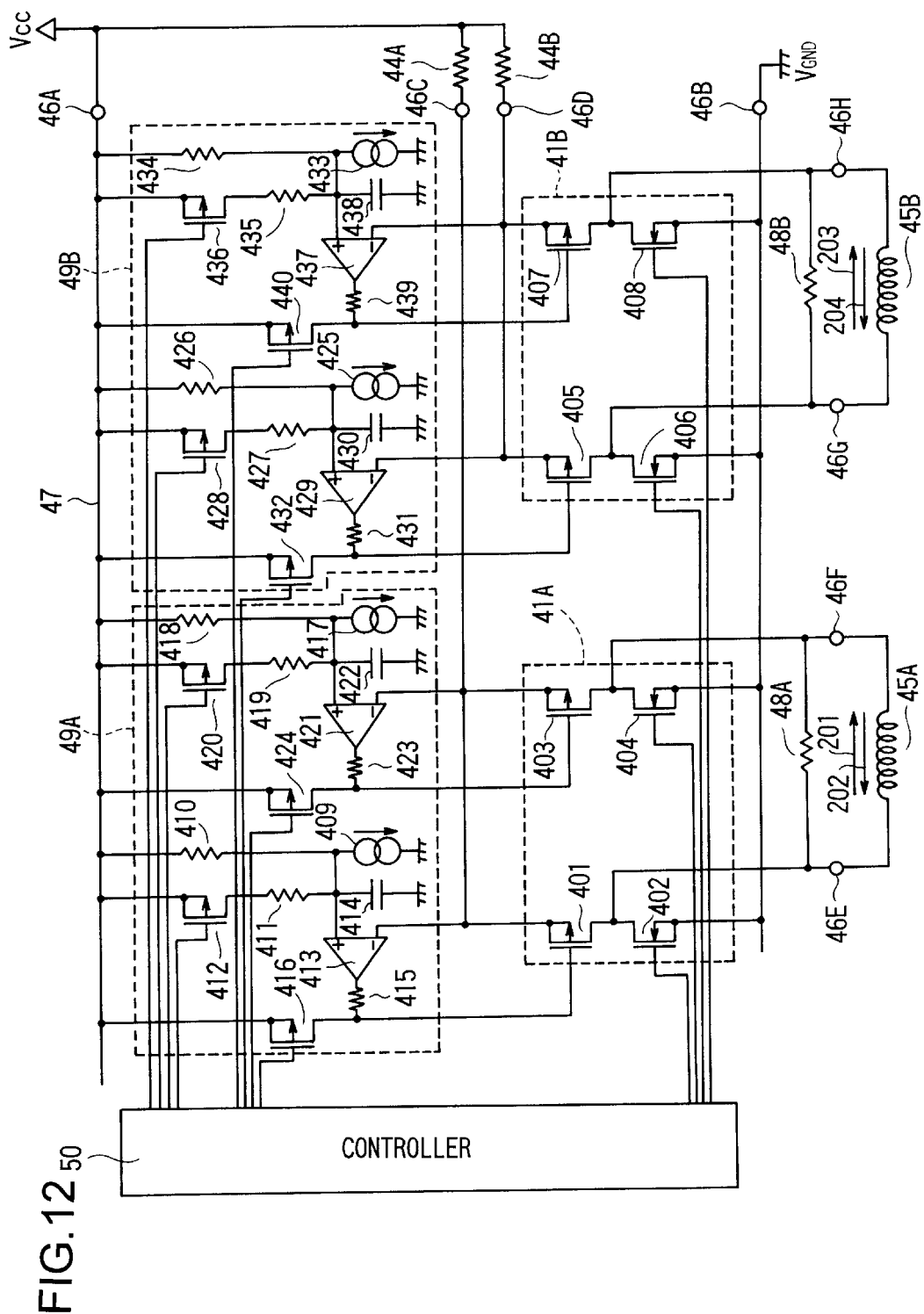
FIG. 12 is a circuit diagram of still another example of stepping motor driver embodying the invention.
Figure 13:
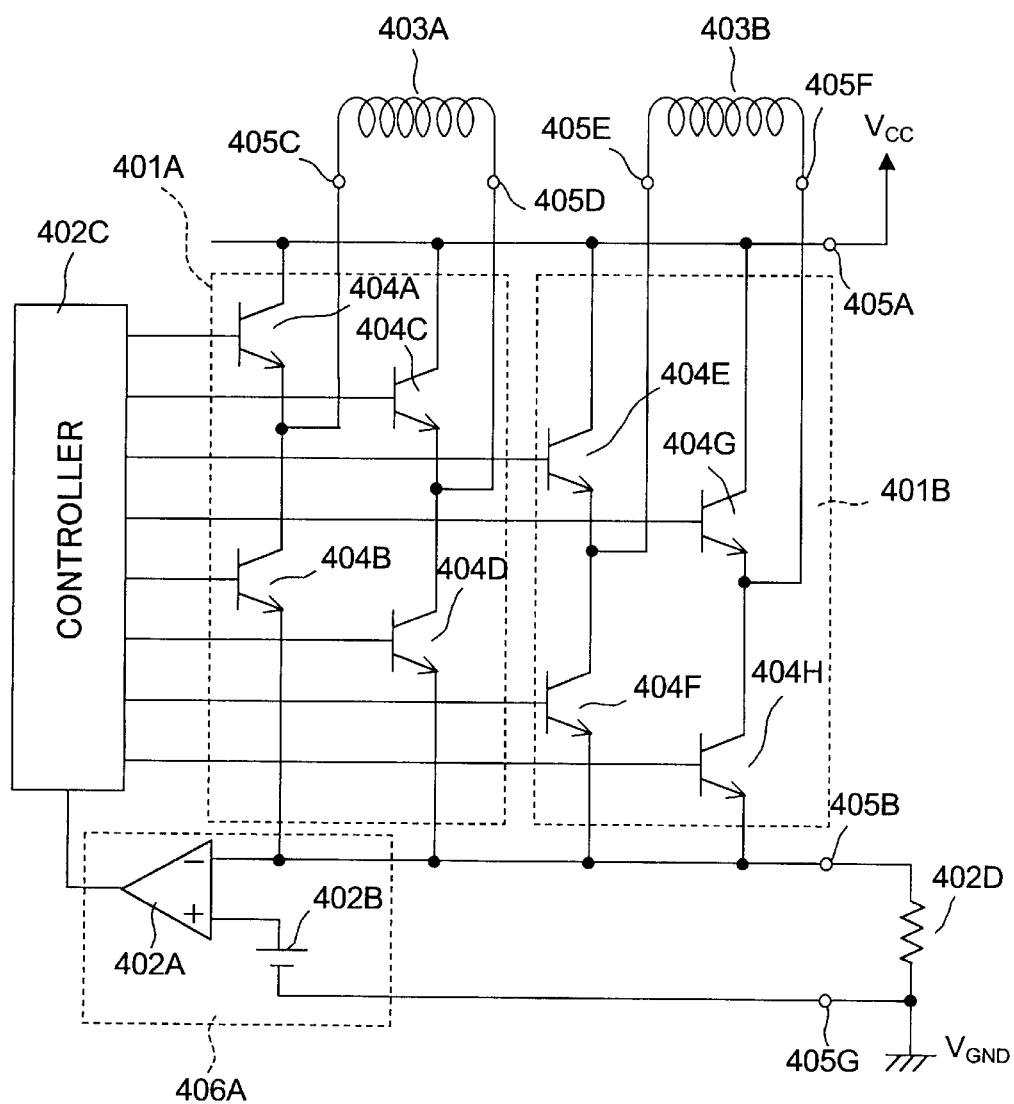
FIG. 13 is a circuit diagram showing the circuit configuration of a conventional, typical stepping motor driver.
Figure 14:
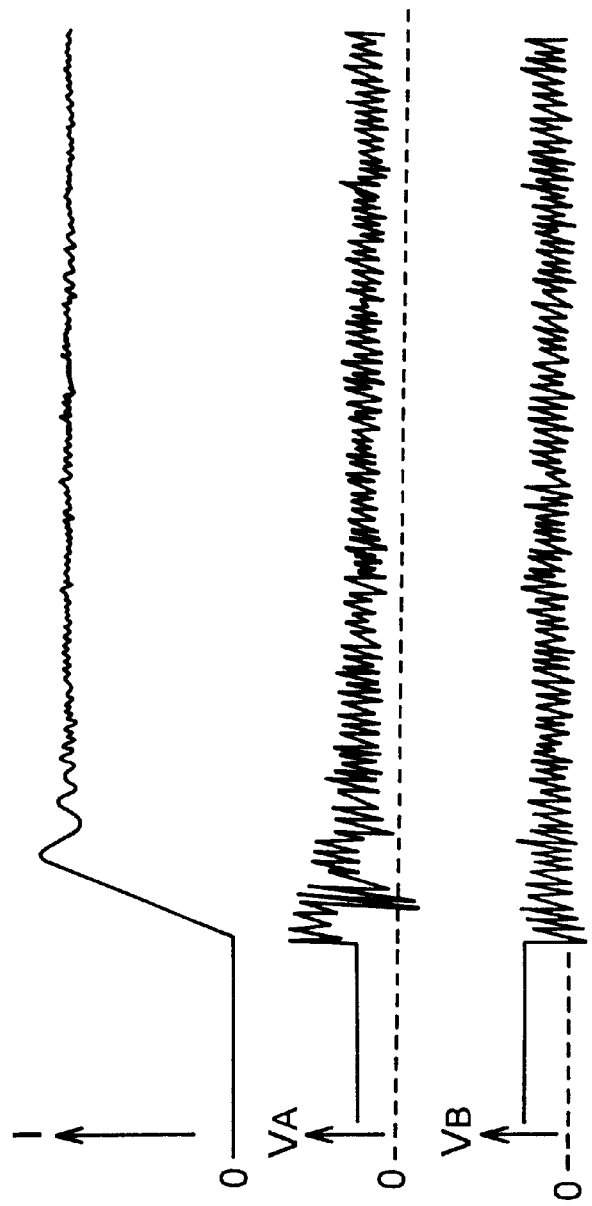
FIG. 14 is a diagram showing the waveform of the current flowing through the coils of the motor and the waveforms of the voltages across the coils of the motor as observed when switching operations are performed in a conventional, typical stepping motor driver.
Figure 15:
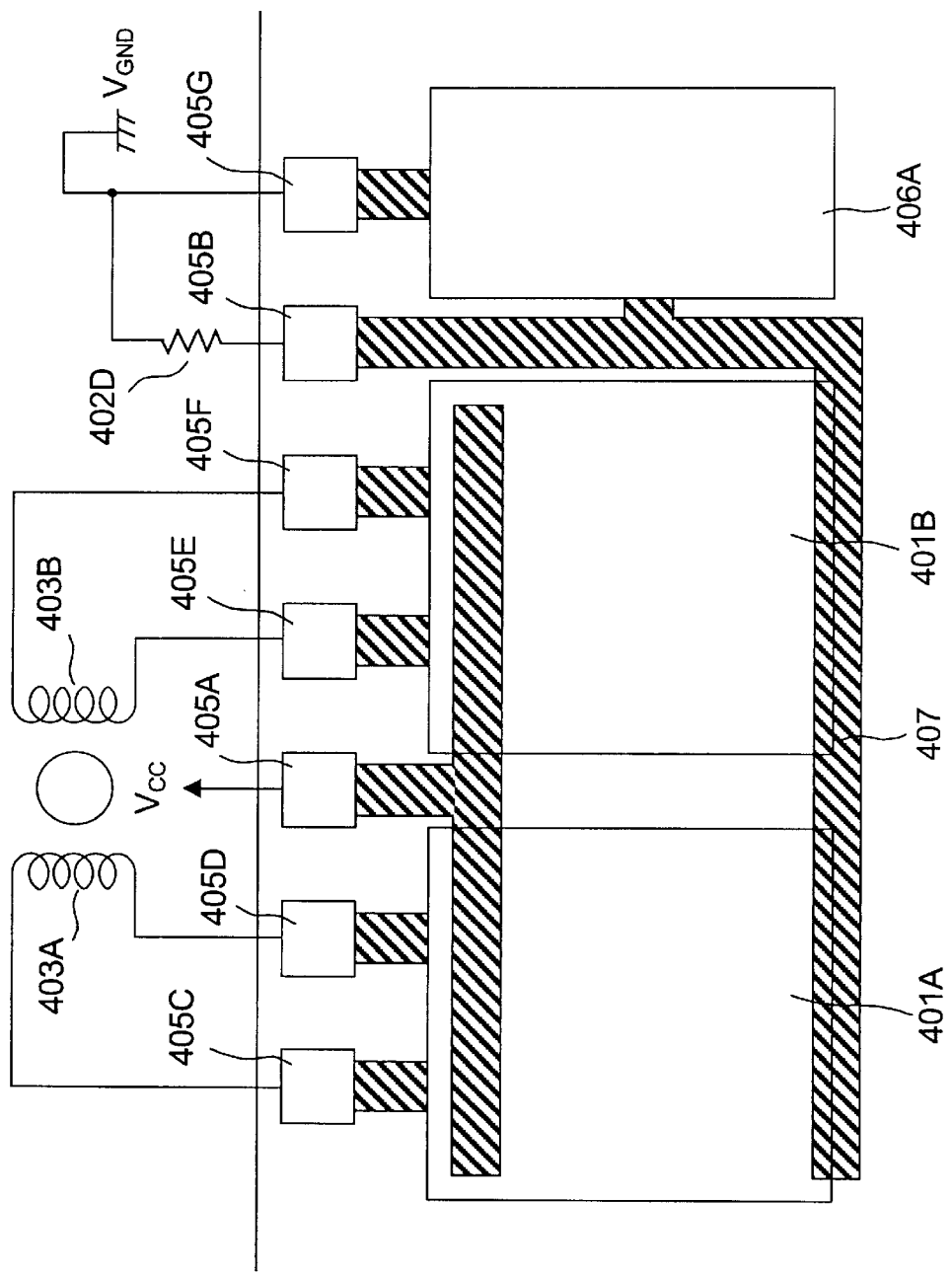
FIG. 15 is a plan view of a conventional, typical stepping motor driver.

In the circuit configuration shown in FIG. 8, damping resistors 48A and 48B may be connected, as shown in FIG. 12, between the terminals 46E and 46F between which the coil 45A of the stepping motor is connected and between the terminals 46G and 46H between which the coil 45B of the stepping motor is connected, respectively. This permits the currents flowing through the coils of the stepping motor to vary more gradually than in a circuit configuration without damping resistors 48A and 48B. In this way, it is possible to further suppress overshooting and oscillation in the currents flowing through the coils and oscillation in the voltages across the coils, and thereby further reduce noise.

In the embodiments described hereinbefore, the resistors 44A and 44B for converting the currents flowing through the coils of the stepping motor into voltages are inserted on the supply voltage side (i.e. on the higher-potential side of the power source); however, it is also possible to insert those resistors on the ground side (i.e. on the lower-potential side of the power source), although inserting them on the supply voltage side (i.e. on the higher-potential side of the power source) makes the circuit configuration simpler.

In the embodiments described hereinbefore, MOS FETs are used as switching devices; however, it is also possible to use bipolar transistors instead. When the transistors constituting the output circuits are turned on/off, all the transistors need not necessarily be turned on/off simultaneously. For example, those transistors into which the currents from the coils have been flowing until just now may be turned from on to off with a delay relative to the timing with which the other transistors are turned on/off.

It is possible to use three or more current limit values, or use different circuit configurations to switch current limit values. The embodiments described hereinbefore deal with drivers for driving stepping motors; however, the present invention is applicable not only to such drivers but also to drivers for driving motors of other types, such as spindle motors, and even to semiconductor devices, such as power switches, that yield high-current outputs to drive loads while limiting currents.

What is claimed is:

1. A motor driver furnished with a function of controlling driving of a motor through negative feedback control of a current supplied to a coil of the motor,
   wherein the motor driver permits setting of a target value of the current that is negatively fed back, and sets the target value in such a way that the target value at a time point when the current starts being supplied to the coil of the motor is smaller than the target value after the current starts being supplied to the coil of the motor, and
   wherein the current supplied to the coil of the motor is negatively fed back by being converted into a voltage by a resistor inserted on a higher-potential side of a power source.

2. A motor driver furnished with a function of controlling driving of a motor through negative feedback control of currents supplied to the motor,
   wherein currents flowing through coils of different phases of the motor are negatively fed back individually.

3. A motor driver as claimed in claim 2,
   wherein output circuits that supply the currents to the coils of different phases of the motor are connected by way of conductors having substantially equal lengths to supply power terminals to which electric power is supplied from outside.

4. A motor driver as claimed in claim 3,
   wherein the conductors that connect the output circuits to the supply power terminals are formed in such a way as to cover those sides of the output circuits which face other internal circuits.

5. A motor driver as claimed in claim 2,
   wherein the motor driver permits setting of a target value of the currents that are negatively fed back, and sets the target value in such a way that the target value at a time point when the currents start being supplied to the coils of the motor is smaller than the target value after the currents start being supplied to the coils of the motor.

6. A motor driver as claimed in claim 2, comprising:
   an operational amplifier that has an inverting input terminal thereof connected to a terminal that is, outside the motor driver, connected through a resistor to a power source and, inside the motor driver, connected to the output circuits, the operational amplifier receiving, at a non-inverting input terminal thereof, a predetermined reference voltage; and
   a switch for turning off at least part of transistors constituting the output circuits,
   wherein an output terminal of the operational amplifier and one end of the switch are connected to the part of the transistors in such a way as to form a circuit through which the currents supplied to the coils of the motor are negatively fed back.

7. A motor driver furnished with a function of controlling driving of a motor through negative feedback control of currents supplied to the motor,
   wherein damping devices are built in between terminals between which coils of the motor are connected.

8. A motor driver as claimed in claim 7,
   wherein currents flowing through the coils of different phases of the motor are negatively fed back individually.

9. A motor driver as claimed in claim 8,
   wherein the motor driver permits setting of a target value of the currents that are negatively fed back, and sets the target value in such a way that the target value at a time point when the currents start being supplied to the coils of the motor is smaller than the target value after the currents start being supplied to the coils of the motor.

* * * * *